Figure 1:
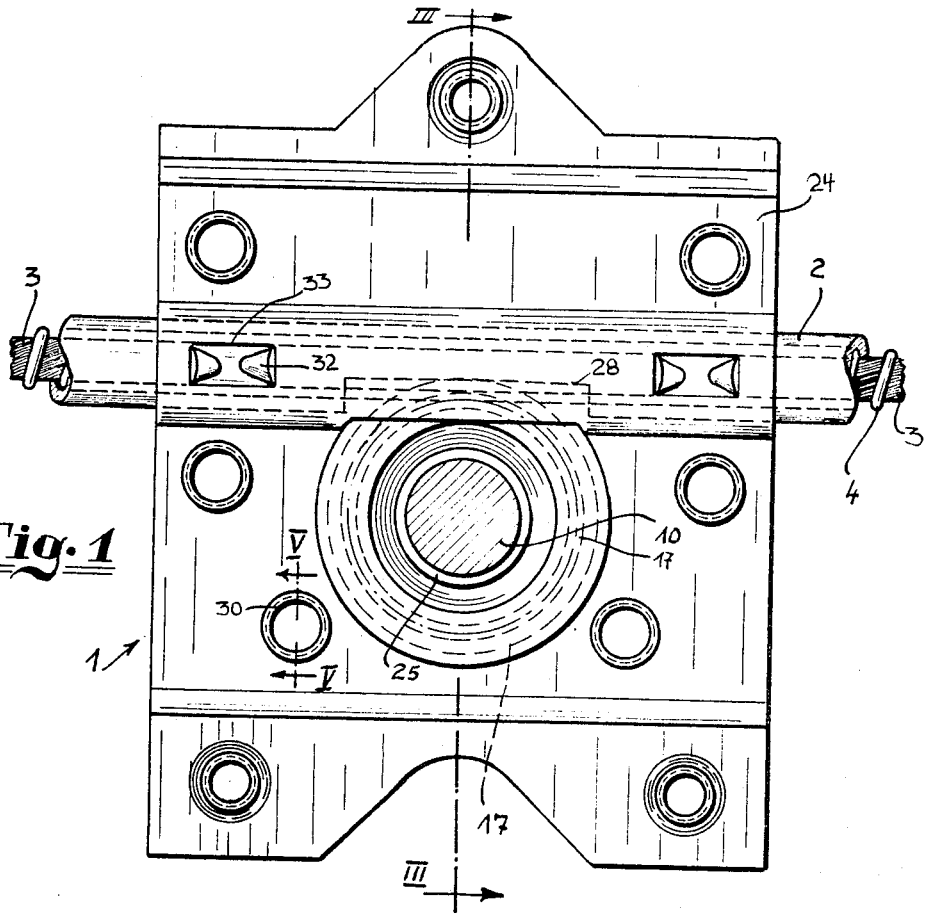

Oct. 25, 1966  J. WERNER  3,280,509
DRIVING DEVICE FOR VEHICLE WINDOWS
Filed June 2, 1965  3 Sheets-Sheet 1

INVENTOR.
Johannes WERNER
BY Nolte and Nolte
ATTORNEYS

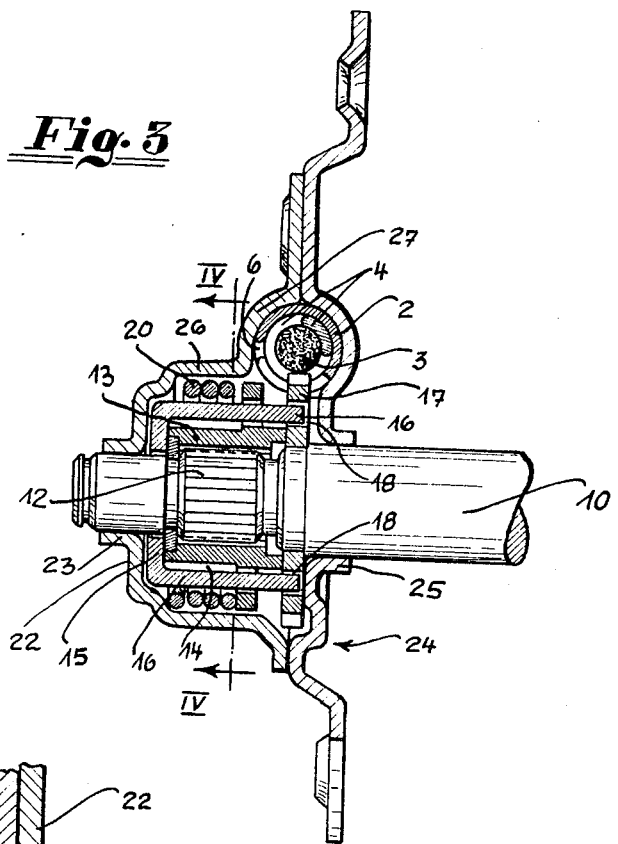
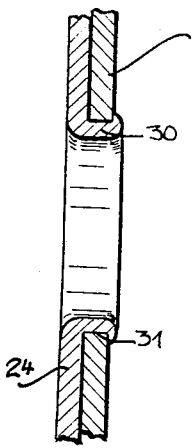
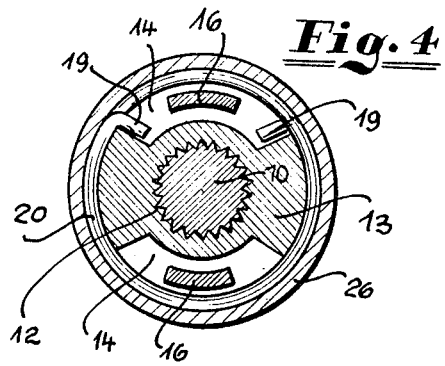

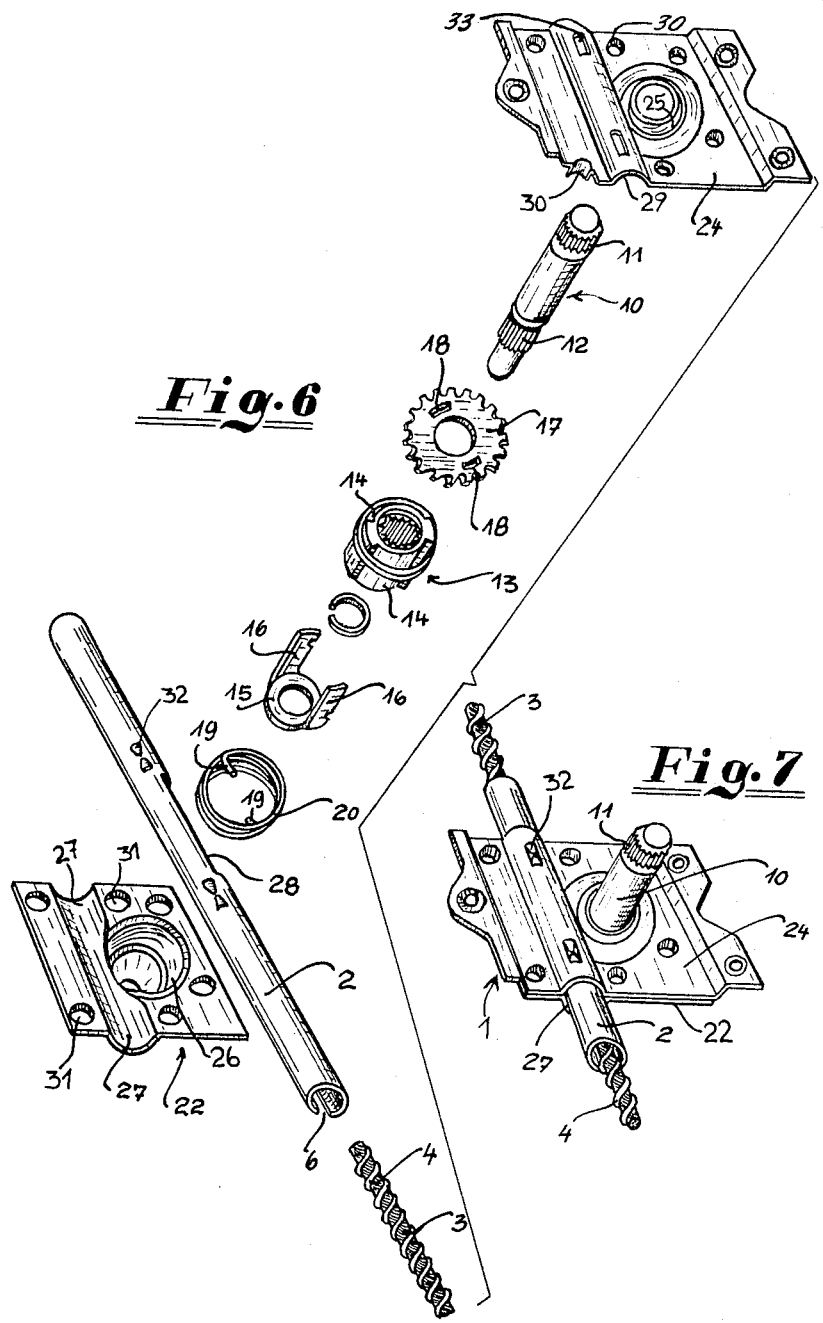

United States Patent Office 3,280,509
Patented Oct. 25, 1966

3,280,509
DRIVING DEVICE FOR VEHICLE WINDOWS
Johannes Werner, Offenbach (Main), Germany, assignor to H. T. Golde G.m.b.H. & Co. K.G., Frankfurt am Main, Germany
Filed June 2, 1965, Ser. No. 460,762
Claims priority, application Germany, Sept. 3, 1960, G 22,606
9 Claims. (Cl. 49—352)

This application is a continuation-in-part application of my copending application Serial No. 135,161, filed August 31, 1961 and entitled Driving Device For Sliding Windows, now abandoned.

This invention relates to a driving device for raising and lowering a vehicle window and the principal feature of the invention resides in the provision of a device of this character which is so constructed as to be readily installed in vehicles of various types and which includes a locking device for irreversible transmission of a driving force of the well known type comprising a coiled braking spring in frictional contact with a housing encircling said spring.

According to a prior construction a driving spindle is rotatably mounted in the housing encircling the braking spring and a driving member encircling said spindle has an arm extending with lateral play through a recess in an enlarged head portion of said spindle, with a spur gear fixed to said arm and an adjustable guide wheel mounted in radially spaced relationship to said spur gear for guiding a threaded cable circumferentially around said spur gear and in engagement therewith. The guide wheel is necessary for maintaining engagement between the spur gear and the threaded cable and further guide wheels are provided for guiding the cable along the path of a means connecting the cable to the window. Because of the several guide wheels requiring separate mountings in predetermined spaced relationship, the installation of such a device involves a considerable amount of an expert's work with preliminary operation in determining the correct spots for the guide wheel mountings on each vehicle.

It is, therefore, a primary object of the invention to provide a device for raising and lowering vehicle windows wherein reliable engagement between a gear, fixed to a driving member associated with a driving spindle and coil spring locking device, and a cable is provided without necessitating separate guide wheels and mountings for these wheels.

A further object of the invention is to provide such a device wherein said reliable engagement is obtained by a cable which is not guided around a portion of the circumference of a gear, but which is only in tangential engagement therewith. While with circumferential engagement a minimum diameter of the gear is defined by the minimum bending radius of the cable the tangential engagement is of great advantage in that a gear of smaller diameter may be used with corresponding reduction of the overall dimensions of the whole device as well as of weight and production costs.

It is to be noted that the problem of reliable engagement increases with decreasing diameter and axial height or thickness, respectively, of the gear. This problem becomes especially serious because of the loose connection between the driving element carrying the gear and the driving spindle, which loose connection provided by the arm of the driving element extending through a recess in the spindle head is inavoidable in devices associated with a coiled braking spring for irreversible transmission.

Accordingly it is a still further object of the invention to provide in a device of the type described above a reliable tangential engagement between a cable and a gear of comparatively small diameter, f.i. 20 mm., and reduced axial height of f.i. 1.5 mm., resulting in heretofore unknown small size and light weight of a device for raising and lowering vehicle windows.

Figure 2:
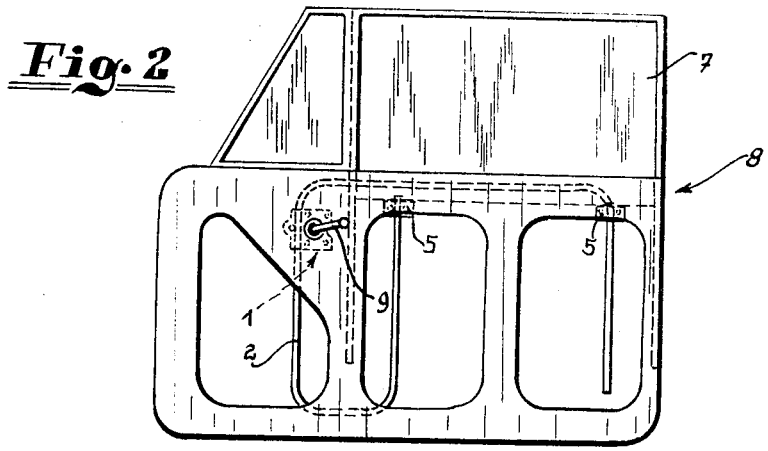

These and other objects and advantages of the invention will become readily apparent from the following description of a preferred embodiment of a device according to the invention in connection with the accompanying drawings in which:

FIG. 1 is an enlarged end view of the device with portion of the cable broken away;
FIG. 2 is a view of a vehicle door as seen from inside with the device according to FIG. 1 installed;
FIG. 3 is a sectional view taken along the line III—III of FIG. 1;
FIG. 4 is a sectional view taken along the line IV—IV of FIG. 3;
FIG. 5 is an enlarged detail sectional view taken along the line V—V of FIG. 1;
FIG. 6 is an exploded view of the device in about natural size (diameter of worm gear 17 about 20 mm.); and
FIG. 7 is a perspective view of the device with the separate parts of FIG. 6 reassembled.

Referring to the drawings the device comprises a housing generally designated 1 with flexible tubular guide means 2 for a flexible cable 3 provided with helical projections 4. Means for operatively connecting the cable 3 to a vehicle window are provided by fittings 5 fixed to the cable 3 at both ends thereof and extending in a manner known per se through a longitudinal slot 6 of the tubular guide means 2, and adapted to be fixed to the lower edge portion of a vehicle window 7 slidably mounted in a vehicle door 8. A hand crank 9 is fixed to a driving spindle 10 rotatably mounted in the housing 1, as will be described more fully hereinafter.

The driving spindle 10 is provided with first serrations 11 for receiving the handle 9 and with second serrations 12 for receiving an enlarged head portion 13 having diametrically opposite recesses 14 formed therein parallel to the axis of the driving spindle.

A driving member 15 encircling the driving spindle has two arms 16 extending through the recesses 14, as best shown in FIGS. 3 and 4. A worm gear 17 is fixed to the free ends of both said arms (though small interspaces are left open in the drawing FIG. 3 between slots 18 provided in the worm gear and said free ends extending therethrough for the sake of clearness of the drawing).

A coiled braking spring 20 is connected with the head portion 13 by means of inwardly bent ends 19 and is in frictional contact with portions of the housing 1 encircling the spring in a known per se manner.

The housing 1 is an assembly of two complementary parts 22 and 24. The two parts 22 and 24 are respectively formed with cylindrical bushings 23 and 25 (see FIG. 3) fitting closely around the periphery of the driving spindle 10 at axially spaced locations, thereby providing each a bearing means for said spindle. The housing part 22 is additionally shaped with an intermediate cylindrical portion 26 providing a braking surface for the spring 20, and with an open channel section 27 of semi-circular cross-section. The inner diameter of said cross-section corresponds to the outer diameter of the tubular guide means 2. Said guide means is received in said channel section, as best shown in FIGS. 3 and 6, with the channel section constituting a back-rest for the tubular guide means and for the cable 3 guided therein.

Portions of the tubular guide means 2 define an aperture 28 (FIG. 6) therein through which a peripheral portion of the worm gear 17 enters into engagement with the cable 3, whereby inclined flanks of the teeth on said peripheral portion enter between and in contact with helical projections 4 on the cable 3.

With the cable 3 extending tangentially to the worm gear 17 hardly more than two teeth will be meshing with the cable at a time, but a sufficient surface of contact is obtainable because according to the invention a worm gear, i.e. a gear having the flanks of its teeth inclined with respect to its axis, is used and moreover because at least one housing part, f.i. part 22, is shaped to simultaneously provide a bearing 23 for the driving spindle 10 and a backrest 27 for the cable guide 2. By this housing part the radial distance of the cable 3 from the axis of the driving spindle 10 is predetermined and maintained during operation. Also the axial position of the driving spindle 10 is predetermined and fixed with respect to the guide means 3 by rigidly interconnecting both housing parts 22 and 24 with their bearing means 23 and 25, respectively, in predetermined axial and circumferential relationship thereby preventing any tilting of the worm gear with respect to the cable 3 or any transaxial movement of the cable with respect to the worm gear.

The rigid interconnection between the two housing parts 22 and 24 may be obtained in any suitable manner by providing complementary markings on both parts to assure assembly thereof in a predetermined relative position. According to the preferred embodiment shown, hollow projections 30 are pressed from the material of part 24 at predetermined locations, spaced from each other and from the bushing 25, while portions of part 22 define complementary holes 31. The projections 30 and the holes 31 constitute matching parts of a hollow-type rivet joint for rigidly interconnecting both parts 22 and 24 of the housing 1. Such a rivet joint is shown in FIG. 5.

In the embodiment shown also the housing part 24 is shaped to provide a channel 29 embracing the tubular guide means 2 diametrically opposite channel 27 of housing part 22, the channels 27 and 29 constituting each a backrest against dislodgement radially from the worm gear 17 and also a lateral support against transxial movement of the cable and its guide means.

To ensure that the edges of the aperture 28 will not interfere with the teeth of the warm gear 17, which interference would cause undesirable rattling noises and moreover abrasion of the teeth and the danger of their disengagement from the helical projections 4, it is important to maintain the initial correct position of the aperture 28. This is accomplished by providing the housing 1 and the tubular guide means 2 with interengaging means for preventing longitudinal and/or rotational movement of the guide means in the housing. Preferably the tubular guide means are provided with radial projections by punching and bending outwardly lips 32 from the tubular material. Corresponding recesses 33 are defined by portions of the housing part 24 for receiving the lips 32.

Though according to the drawings two diametrically opposite recesses 14 are shown on the enlarged head portion 13 for receiving the two arms 16 of the driving member 15 a device may also be constructed with only one recess 14 and one arm 16 without departing from the scope of the invention. Also different from the showing of FIG. 3 it is often sufficient to provide only one end of the cable 3 with a fitting 5 or another means for operatively connecting said one end to the window at the centre of its lower edge or below the centre of gravity of the window, respectively. The tubular guide means may be made from flexible plastic material and fixed in the desired position on the vehicle. Alternately a comparatively stiff flexible or pliable material as f.i. sheet metal may be used, which will substantially retain a desired shape, f.i. that shown in FIG. 2, after preliminary bending into this shape. Thus a series of suitably bent guide means may be prefabricated for installation in vehicles of the same type.

The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A driving device for raising and lowering a vehicle window comprising a driving spindle having an enlarged head portion having formed therein at least one recess parallel to the axis of said driving spindle, a driving member encircling said spindle and having an arm parallel to said axis and extending along the interior of said recess, a worm gear encircling said spindle and fixed to said driving member, so that when said spindle is turned in one direction or another a portion thereof situated at one or the other sides of said recess will engage said arm of said driving member to rotate the latter and said gear therewith, a flexible cable in tangential engagement with said worm gear, said cable having projections meshing with teeth of said gear so that upon rotation of the latter said cable will be longitudinally moved, tubular guide means for said cable, portions of said tubular guide means defining an aperture at the location of said engagement of said cable with said gear, housing consisting of two parts, each part being formed with a bearing means for said spindle, at least one of said two parts being shaped to provide a back-rest for said guide means near said aperture thereby defining the radial distance of said guide means from said spindle to prevent disengagement between said cable and said worm gear, means rigidily interconnecting both said housing parts in predetermined axial and circumferential relationship, and means operatively connecting said cable to said window.

2. A driving device as claimed in claim 1, wherein said two parts of said housing are shaped to provide corresponding open channel sections of semi-circular cross-section with the inner diameter of the cross-section corresponding to the outer diameter of said tubular guide means, each of said channel sections constituting a lateral support for said tubular guide means.

3. A driving device as claimed in claim 1, wherein said interconnecting means comprises at least two hollow projections provided on one of said two housing parts and spaced from each other and from the bearing means of said one part, portions of the other of said two housing parts defining holes for receiving said hollow projections, said projections and said holes constituting parts of a hollow type rivet joint for interconnecting said two housing parts.

4. A driving device as claimed in claim 1, wherein said tubular guide means and portions of said housing adjacent said tubular guide means are provided with interengaging means preventing longitudinal and/or rotational movement of said tubular guide means in said housing.

5. A driving device as claimed in claim 4, wherein said interengaging means comprises radial projections provided on said tubular guide means and recesses defined by portions of one of said two housing parts for receiving said radial projections.

6. A driving device as claimed in claim 1, wherein said means for operatively connecting said cable to said window are disposed at the lower edge thereof and two laterally spaced locations, said connecting means having end portions arranged in parallel spaced relationship but oppositely directed to obtain parallel guidance of both cable ends upon rotation of said worm gear.

7. A driving device as recited in claim 1 and wherein said projections of said cable have a helical configuration.

8. A driving device as recited in claim 1 and wherein a coiled braking spring surrounds said head portion and has free ends extending into said recess to be alternately engaged by said head portion at one side or the other of said recess depending upon the direction of rotation of said driving spindle, said housing encircing said spring and being in frictional contact therewith.

9. A driving device for raising and lowering a vehicle window comprising a driving spindle having an enlarged head portion having formed therein two diametrically opposite recesses parallel to the axis of said driving spindle, a driving member encircling said spindle and having two arms extending through said recesses, a worm gear encircling said spindle and fixed to the free ends of said two arms, a flexible cable in tangential engagement with said worm gear, said cable having projection meshing with teeth of said gear so that said cable is moved when said gear turns, flexible tubular guide means for said cable, portions of said tubular guide means defining an aperture at the location of said engagement of said cable with said gear, a housing consisting of two parts, each part being formed with a bearing means for said spindle, at least one of said two parts being shaped to provide a back-rest for said guide means near said aperture thereby defining the radial distance of said guide means from said spindle to prevent disengagement between said cable and said worm gear, means rigidly interconnecting both said housing parts in predetermined axial and circumferential relationship, and means operatively connecting said cable to said window.

References Cited by the Examiner
UNITED STATES PATENTS

| | | | |
|---|---|---|---|
| 2,498,843 | 2/1950 | Pile | 192—8 |
| 2,943,514 | 7/1960 | Golde | 268—133 |

HARRISON R. MOSELEY, *Primary Examiner.*

J. K. BELL, *Assistant Examiner.*